United States Patent [19]
Van Wonterghem

[11] Patent Number: 5,907,973
[45] Date of Patent: Jun. 1, 1999

[54] TRANSMISSION DEVICE FOR CONVERTING A REAR-WHEEL OR FOUR-WHEEL FRONT-CAB VEHICLE

[76] Inventor: Antoine Van Wonterghem, Gentsestraat, 195 Geraardsbergen, Belgium, B - 9500

[21] Appl. No.: 08/611,346

[22] Filed: Mar. 6, 1996

[30] Foreign Application Priority Data

Mar. 10, 1995 [BE] Belgium .................................. 9500211

[51] Int. Cl.⁶ .......................... B60K 17/08; B60K 17/22; F16H 57/02
[52] U.S. Cl. ........................ 74/421 R; 180/374; 180/383
[58] Field of Search .......................... 74/421 R, 665 GA, 74/665 GD, 606 R; 180/374, 377, 383, 292, 247; 280/790

[56] References Cited

U.S. PATENT DOCUMENTS

| | | |
|---|---|---|
| 3,656,573 | 4/1972 | Halberg . |
| 3,814,201 | 6/1974 | O'Brien . |
| 3,901,092 | 8/1975 | Romick . |
| 4,014,221 | 3/1977 | Eastwood ............................ 74/665 GA |
| 4,270,409 | 6/1981 | Glaze et al. ........................ 74/665 GA |
| 4,559,846 | 12/1985 | Cochran et al. .................... 74/665 GA |
| 4,632,207 | 12/1986 | Moore ..................................... 180/247 |
| 4,688,447 | 8/1987 | Dick ....................................... 74/665 T |
| 4,805,472 | 2/1989 | Aoki et al. ............................... 180/247 |
| 4,901,598 | 2/1990 | Batchelor et al. ................. 74/665 GA |
| 5,511,448 | 4/1996 | Kameda et al. .................... 180/247 X |

*Primary Examiner*—Khoi Q. Ta
*Assistant Examiner*—Troy Grabow
*Attorney, Agent, or Firm*—Baker & Botts, L.L.P.

[57] ABSTRACT

Transmission device for vehicles with a front cab, with front-wheel drive, and with a chassis to which bodywork may be added. This device relates more particularly to vehicles intended, from the outset or after conversion, to take a lowered platform, especially showman's vehicles, mobile laboratories, or travelling sales vehicles. The device, designed for a front-wheel drive motor vehicle with a front cab and a lowered chassis, comprises a front axle assembly and a gearbox, the output shaft of which is arranged longitudinally with respect to the axis of the vehicle, behind the gearbox. It includes a casing, a first gear which can be mounted on the output shaft of the gearbox, a second gear mounted on a transfer shaft towards the front axle assembly and an intermediate gear permanently in mesh with the first gear and the second gear.

20 Claims, 3 Drawing Sheets

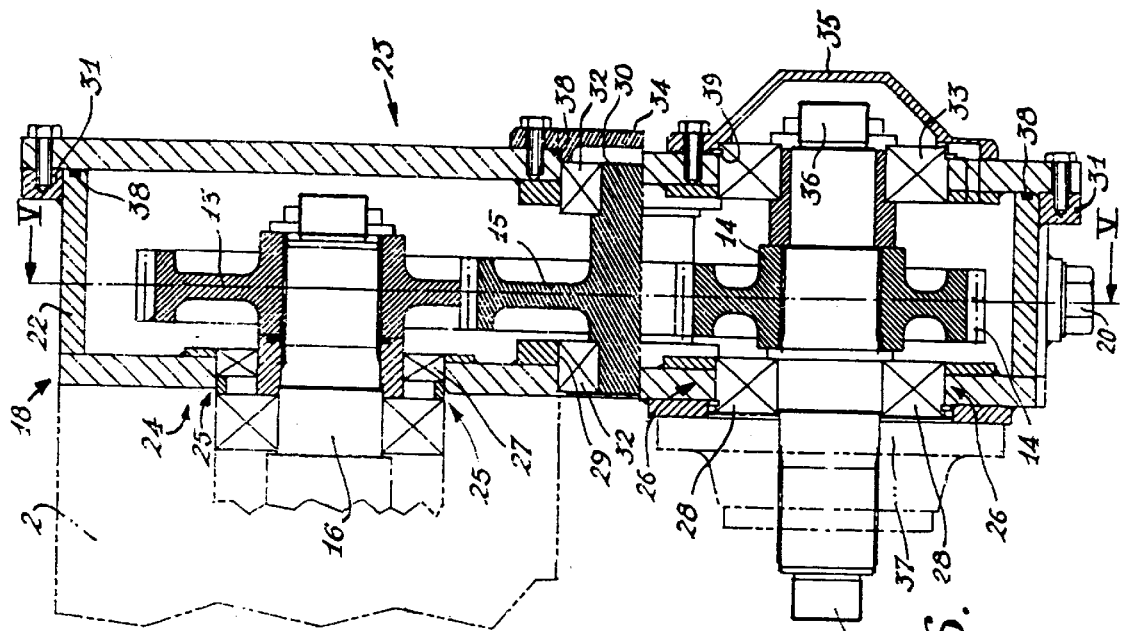
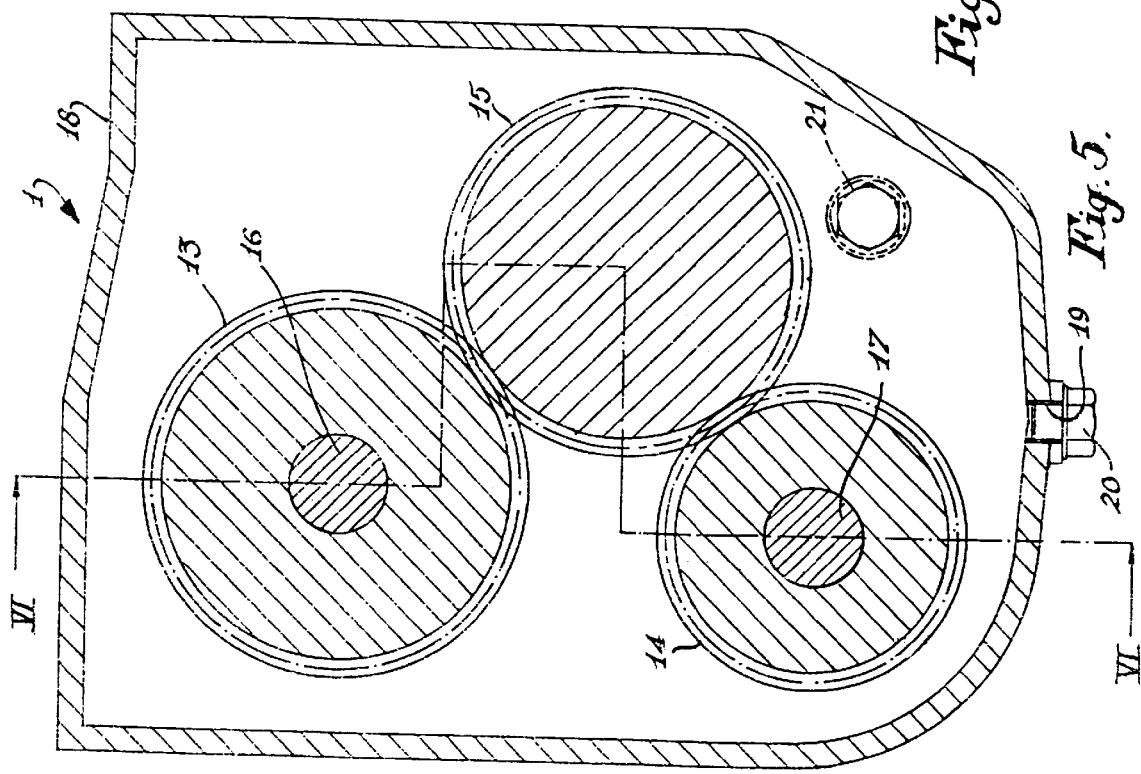

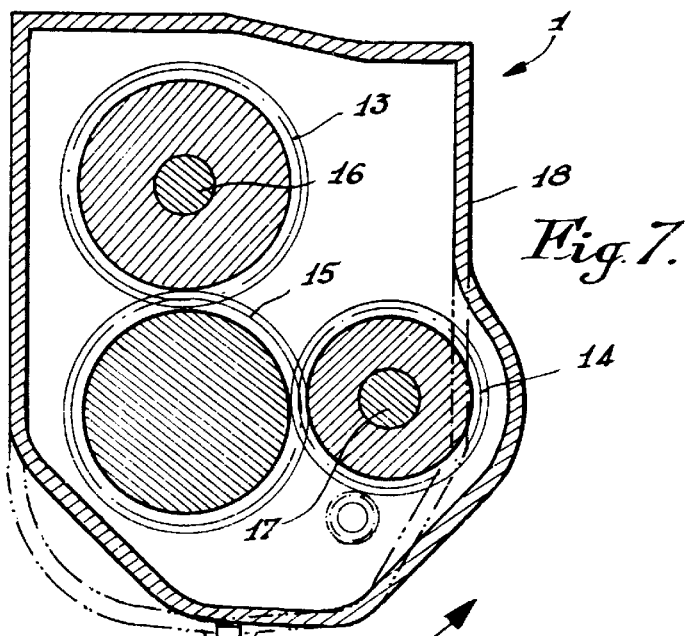
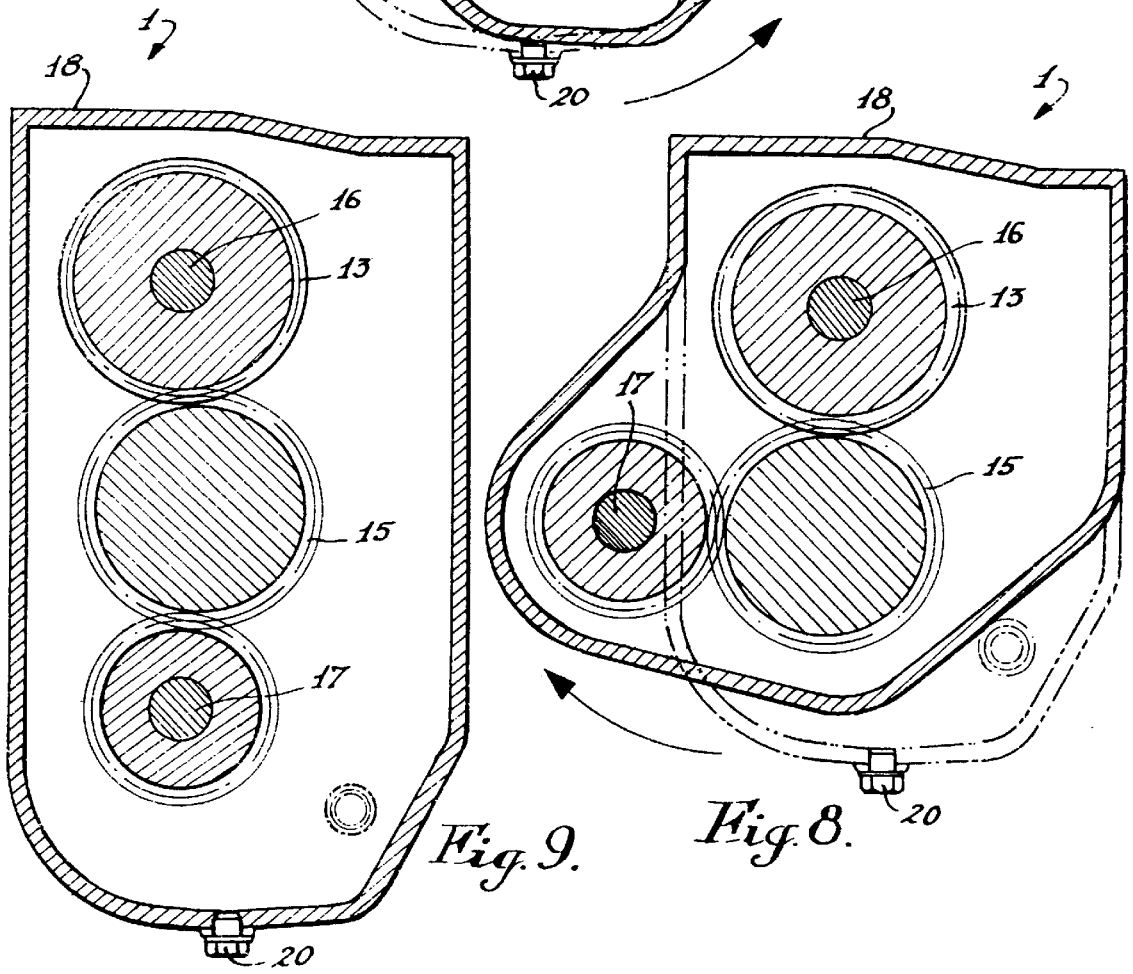
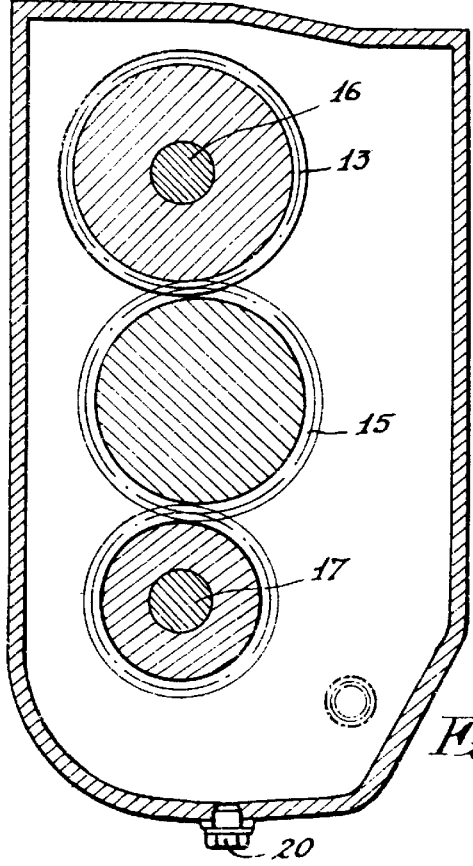

TRANSMISSION DEVICE FOR CONVERTING A REAR-WHEEL OR FOUR-WHEEL FRONT-CAB VEHICLE

BACKGROUND OF THE INVENTION

1) Field of the invention

The invention relates to transmission devices for converting vehicles with a front cab, to front-wheel drive, vehicles with a chassis to which bodywork may be added. The invention relates more particularly to vehicles intended, from the outset or after conversion, to take a lowered platform, especially showman's vehicles, mobile laboratories, or travelling sales vehicles.

2) Description of the prior art

For obvious reasons of cost reduction, the manufacturers of vehicles for specific uses like those described hereinabove generally make use of standard vehicle chassis supplied by the large manufacturers or by specialized manufacturers.

The case of vehicles with a lowered rear platform poses a problem in this respect.

This is because the lowered platform forces the manufacturer to use basic vehicles with front-wheel drive; this does not pose great problems for vehicles of limited power (van type) which offer a huge choice in this range of vehicle.

However, if a heavier vehicle (over 6 tonnes) is desired, the commonest basic vehicles are haulage vehicles with a front cab originally designed for propulsion, (i.e. rear wheel drive) or even for all-wheel drive, or which include a transmission system derived from 4×4 or 6×6 drive as described e.g. in U.S. Pat. No. 3,656,573. As a consequence, the drive system [gearbox+transmission] on these basic vehicles occupies a substantial length starting behind the cab, and this correspondingly limits the possible length of the lowered platform. Such a transmission system additionally leads to not insignificant mechanical losses due to friction.

BRIEF SUMMARY OF THE INVENTION

The development, starting from conventional cabbed haulage vehicles, of a transmission device better suited to vehicles with lowered platform has therefore been sought.

A first object of the invention is to reduce as far as possible the rearwards extension of the drive system [gearbox+transmission] of such vehicles.

Another object of the invention is to reduce, as much as possible, the modifications to be made to the basic vehicle.

Another object of the invention is to be able to transmit high power without difficulty.

Another object of the invention is that it should be possible to adapt the transmission device to a wide variety of models of basic vehicle so as to be able to mass-produce it, therefore to produce it at low cost.

Another object of the invention is that this device should, as far as possible, make use of standardized components, reducing the manufacturing costs and the problems of carrying stock.

The subject of the invention is a transmission device for converting a vehicle with a front cab and lowered chassis, comprising a front axle assembly an engine and a gearbox, the output shaft of which is arranged longitudinally with respect to the axis of the vehicle, behind the gearbox and rearwardly with respect thereto, into a front-wheel drive vehicle; said device comprises a casing including a front face provided with means for positioning the casing relative to the rear face of the gearbox, an inlet passage for the output shaft of the gearbox and an outlet passage for a transfer shaft directed toward the engine and arranged in a substantially horizontal plane below a substantially horizontal plane of the output shaft of the gearbox;

a first gear which can be mounted on the output shaft of the gearbox;

a second gear mounted on the transfer shaft, an intermediate gear permanently in mesh with the first gear and the second gear, the three gears being arranged substantially in one and the same plane which is transverse with respect to the axis of the vehicle.

The three gears are preferably spur gears with helical teeth;

The teeth of these gears advantageously form an angle of 20° with their respective axes.

According to a preferred embodiment, the diameters of the gears are such that the output ratio of the device is between 1/1 and 1/1.6 and preferably of the order of 1/1.27.

The casing generally has a low point, a drain orifice being made at this low point.

According to an advantageous embodiment, the casing comprises a dish-shaped body, the bottom of this dish forming the front face of the said casing, and a cover which can be secured hermetically by its perimeter against the flanks of the dish forming the body, the said cover forming the rear face of the said casing.

In this embodiment, the axis of the intermediate gear and of the transfer shaft are supported by centring and guiding means secured directly to the front face and to the rear face of the casing.

The rear face is preferably pierced respectively level with the axis of the second gear and with the axis of the intermediate gear with an orifice allowing the insertion and access to these centring and guiding means, a closure plate hermetically covering each of these orifices.

The centring and guiding means are generally roller or needle bearings.

According to one embodiment of the device according to the invention, the axis of the transfer shaft is arranged close to the vertical plane containing the axis of the output shaft of the gearbox.

According to another embodiment of this device, the transfer shaft is laterally offset to the left or to the right with respect to the vertical plane containing the axis of the output shaft of the gearbox.

Advantageously a protective boot is fixed to the front face of the casing around the transfer shaft.

According to an alternative form, the device further comprises a hydraulic pump.

Another subject of the invention is a vehicle with a front cab, with a lowered platform, comprising a transmission device as described hereinabove.

The device according to the invention may just as easily be supplied to specialized manufacturers (coachworks, etc.) as a standard unit to replace the cardan-type transfer gearbox originally fitted to the basic haulage vehicles, as be supplied to the large manufacturers in order thus to constitute an original equipment option for the basic vehicles.

BRIEF DESCRIPTION OF THE DRAWINGS

Other specific features and advantages of the invention will emerge from the description of a specific embodiment, reference being made to the appended figures, in which:

FIG. 5 is a view in transverse section of the transmission device taken along vertical plane V—V of FIG. 1;

FIG. 6 is a view in section of the transmission device taken along vertical plane VI—VI of FIG. 5;

FIGS. 7, 8 and 9 are views in transverse section of other embodiments of the transmission device according to the invention.

DETAILED DESCRIPTION OF THE DRAWINGS

Figure 1:
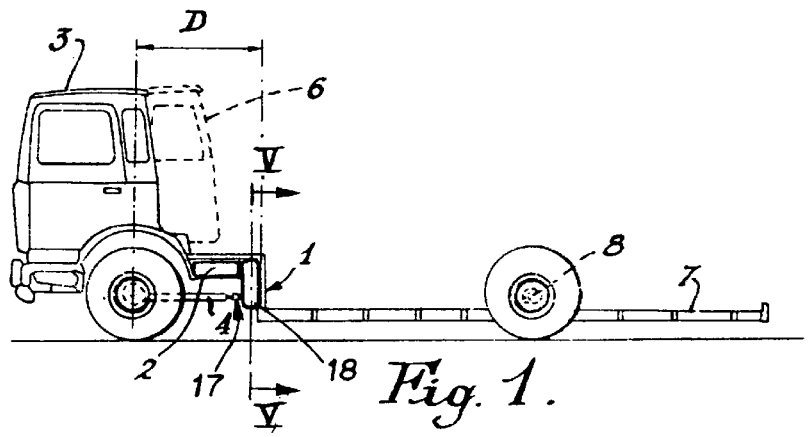
FIG. 1 is a diagrammatic side view of a vehicle with a cab and with a lowered platform, provided with a transmission device according to the invention.
Figure 2:
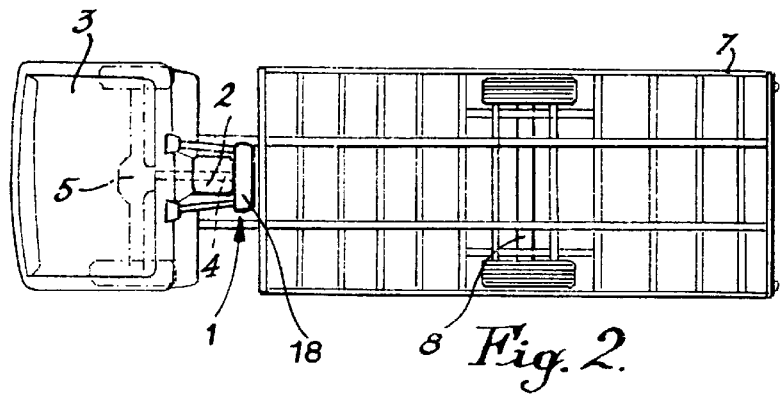
FIG. 2 is a diagrammatic view from above of the vehicle of FIG. 1.

FIGS. 1 and 2 show, respectively in a side view and in a view from above, a vehicle to which bodywork may be fitted, equipped with the transmission device 1 according to the invention. This device 1 is fitted against the back of the original gearbox 2 of the basic vehicle, this gearbox 2 being arranged, together with the engine block (not shown) under the cab 3 of the basic vehicle.

A cardan shaft 4 connects a transfer shaft 17 of the transmission device 1 to the front axle assembly 5 of the vehicle.

The vehicle may be equipped with a conventional cab 3 or with a stretched cab 6 (represented in dotted line in FIG. 1). As the front has undergone only slight conversion, it retains all the advantages of the basic vehicle (especially very easy access to the driving members thanks to the tip-up cab 3, 6).

The rear of the chassis of the converted vehicle consists of a lowered platform 7 supported by a rear axle 8 which has no driving function. (The rear suspension may, depending on the weight of the vehicle, have one or two axles.)

Figure 3:
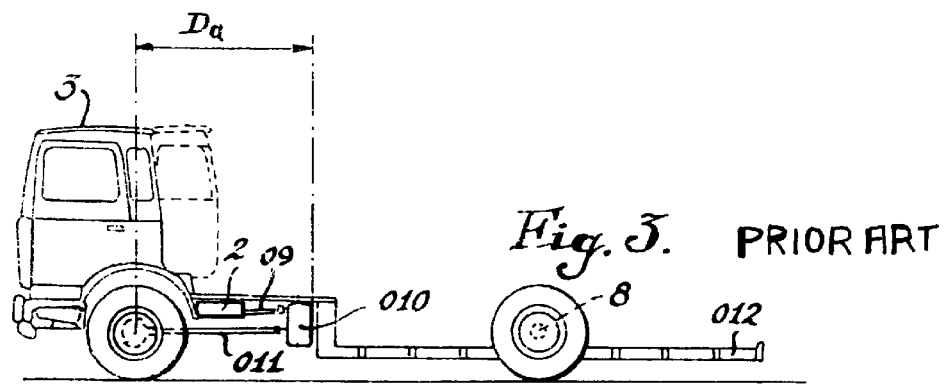
FIG. 3 is a diagrammatic side view of a vehicle with a lowered platform, provided with conventional transmission according to the prior art.
Figure 4:
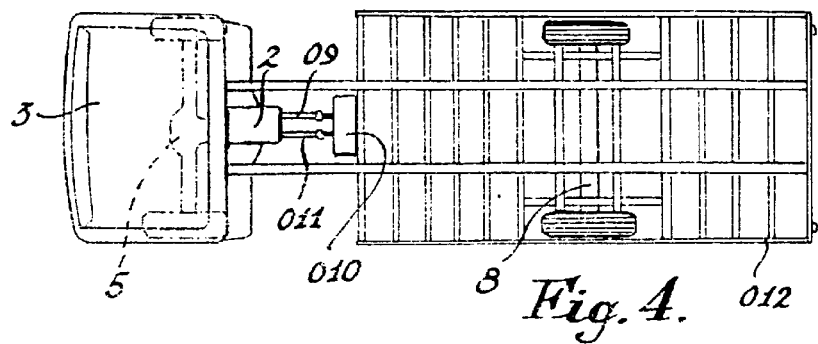
FIG. 4 is a diagrammatic view from above of the vehicle according to the prior art of FIG. 3.

The advantages of the vehicle equipped with a transmission device 1 according to the invention immediately become apparent when the vehicle represented in FIGS. 1 and 2 is compared with a similar vehicle according to the prior art, as shown in FIGS. 3 and 4 (the reference numbers relating to this vehicle according to the prior art are preceded by a 0).

In this vehicle according to the prior art, the original gearbox 2 transmits the torque from the engine via a cardan shaft 09 towards a (4×4) transfer box 010 situated behind the original chassis. This transfer box 010 normally includes an output towards the rear axle assembly (assemblies) 8, which is not used, and an output towards the front axle assembly 5 to which it is connected by a second cardan shaft 011.

The lowered platform 012 of the vehicle according to the prior art is, for the same wheelbase, much shorter than that of the vehicle represented in FIGS. 1 and 2, the distance between the axis of the front axle assembly and the back end of the transmission system ($D_a$) being markedly greater than the corresponding distance (D) of the vehicle equipped with the device according to the invention. The gain in length obtained is of the order of 1 to 1.2 metres (4 to 5 feet).

FIG. 5 shows, in transverse section, the transmission device 1 according to the invention, which will be described also with reference to FIG. 6.

The device 1 essentially comprises three gears 13, 14, 15 situated essentially in one and the same plane.

The first gear 13 is mounted on the output shaft 16 of the gearbox 2 (represented partially in broken line in FIG. 6).

The second gear 14 is fixed to a transfer shaft 17. The transfer shaft 17 is connected to cardan shaft 4 in a conventional manner known to those skilled in the art. An intermediate gear 15 places the first and second gear in mesh with each other.

A casing 18, fixed to the back end of the gearbox 2 surrounds the three gears 13, 14, 15.

This casing 18, once in use, contains a lubricant and consequently has an orifice 19 situated at its low point and closed by a threaded plug 20 as well as a top-up orifice 21.

According to one embodiment which has not been represented, a hydraulic pump may be mounted on the casing 18 so as to bring about the lubrication of the moving parts.

The shape of the casing 18 is designed for it to have the smallest possible bulk with respect to the power to be transmitted. As represented in FIG. 6, this casing consists of a body 22 and of a cover 23 forming a hermetic unit.

The body 22 of the casing 18 has the shape of a dish placed on edge, the bottom of this dish forming the front face 24 of the casing.

The front face 24 is pierced right through for the passage of the output shaft 16 of the gearbox 2 and of the transfer shaft 17. Housings 25, 26 are made around these passages for fixing rotary means 27, 28 for supporting these shafts. These rotary support means are, in this case, roller bearings 27, 28, and a housing 29 is also arranged at the location of the shaft 30 of the intermediate gear 15.

The cover 23 constituting the rear face of the casing 18 is fixed to the body 22 by bolting to a peripheral flange 31 which borders the perimeter of the body 22 of the casing 18. The cover 23 of the casing is also pierced with two orifices, centred respectively on the shaft 30 of the intermediate gear 15 and on the axis of the transfer shaft 17. Rotary support means 32, 33 (in this case roller bearings 32, 33) are fixed to the cover 23 of the casing, facing the housings 26, 29 of the front face 24 of the body 22 of the casing 18. The orifices made in the cover give access to these roller bearings 32, 33 without having to open the casing 18.

The orifice corresponding to the shaft 30 of the intermediate gear 15 is hermetically sealed by a closure plate 34 bolted on.

The orifice of the cover 23 corresponding to the transfer shaft 17 is closed by a cup 35, leaving a space between the rear end 36 of the transfer shaft 17 and the cup 35.

The front end of the transfer shaft 17 is optionally protected from knocks and dirt by a boot 37 (represented in broken line) fixed to the front face 24 of the casing 18.

Sealing between the various parts 22, 23, 34 of the casing 18 is achieved by the interposition of 0-ring seals 38 or flat seals 39.

The simplicity and compactness of the transmission device 1 gives it problem-free running for vehicles the weight of which can vary between 6 and 12 tonnes (gross vehicle weight rating) or 21 tonnes (gross weight including trailer) and developing up to 250 hp and above.

The mechanical losses due to friction are reduced to a minimum.

The production of vibration—always undesirable—is avoided through the use of gears 13, 14, 15 with helical teeth. In this respect, inclining the teeth by 20° with respect to the axis gives the best results.

The ratio between the diameters of the three gears 13, 14, 15 is chosen so as not to yield a substantial modification in the transmission ratio between the gearbox 2 and the front axle assembly 5. In this case it is between 1/1 and 1/1.6, with an optimum value close to 1/1.27.

As the lowered platform 7 ends up markedly lower down than the original chassis of the basic vehicle, the transfer shaft 17 ends up practically at the same height as the front axle assembly 5, this resulting in low mechanical losses due to friction in the cardan shaft 4.

FIGS. 7 and 8 show two other embodiments of the transmission device according to the invention. Depending on the relative position of the front axle assembly casing 5 with respect to the output shaft of the gearbox 2, the position of the transmission shaft 17 may, as desired, be offset to the left or to the right from a vertical plane containing the axis of the output shaft 16.

FIG. 9 shows another embodiment in which the transfer shaft is greatly offset downwards with respect to the axis of the output shaft 16 of the gearbox.

Moreover, the device described here has more specifically been designed to be connected to a gearbox of the Eaton 4106a® type, the configuration of which is particularly well suited to connection to the device 1 as described. It goes without saying that for those skilled in the art, such a device may easily be adapted for other types of gearbox, by adapting the fixing system or the system for the relative positioning of the gearbox 2 and of the device 1.

It also goes without saying that the output shaft 16 may drive the first gear 13 via an intermediate connecting piece, without this in any way departing from the original concept of the invention.

What is claimed:

1. A transmission device for converting a front-cab vehicle, comprising a front axle assembly, an engine and a gearbox, the output shaft of which is arranged longitudinally with respect to the axis of the vehicle and rearwardly with respect to the gearbox, into a front-wheel drive vehicle, the transmission device comprising:

a casing including a front face having means for positioning the casing adjacent a rear face of the gearbox, an inlet passage for the output shaft of the gearbox and an outlet passage for a transfer shaft directed toward the engine and arranged in a substantially horizontal plane below a substantially horizontal plane of the output shaft of the gearbox;

a first gear mountable on the output shaft of the gearbox;

a second gear mounted on the transfer shaft; and an intermediate gear permanently in mesh with the first gear and the second gear, the three gears being arranged substantially in a common plane which is transverse with respect to the axis of the vehicle, wherein the first gear drives the full power of the engine through the intermediate gear to the second gear.

2. The transmission device according to claim 1, wherein the three gears are spur gears with helical teeth.

3. The transmission device according to claim 2, wherein the teeth of the gears form an angle of 20° with their respective axes.

4. The transmission device according to claim 1, wherein the diameters of the gears are such that the output ratio of the device is between 1/1 and 1/1.6.

5. The transmission device according to claim 2, wherein the diameters of the gears are such that the output ratio of the device is between 1/1 and 1/1.6.

6. The transmission device according to claim 4, wherein the output ratio of the device is approximately 1/1.27.

7. The transmission device according to claim 1, wherein the casing comprises:

a dish-shaped body, the dish-shaped body having a flanged border and the bottom of the dish-shaped body forming the front face of the casing; and a cover which can be secured hermetically at its perimeter against the flanged border of the dish body, the cover forming the rear face of the casing.

8. The transmission device according to claim 2, wherein the casing comprises:

a dish-shaped body, the dish-shaped body having a flanged border and the bottom of the dish-shaped body forming the front face of the casing; and a cover which can be secured hermetically by its perimeter against the flanged border of the dish-shaped body, the cover forming the rear face of the casing.

9. The transmission device according to claim 7, wherein the axis of the intermediate gear and of the transfer shaft are supported by centering and guiding means secured directly to the front face and to the rear face of the casing.

10. The transmission device according to claim 8, wherein the axis of the intermediate gear and of the transfer shaft are supported by centering and guiding means secured directly to the front face and to the rear face of the casing.

11. The transmission device according to claim 9, wherein the rear face of the casing includes, respectively level with the axis of the second gear and with the axis of the intermediate gears orifices allowing the insertion and access to the centering and guiding means, a closure plate hermetically covering each of the orifices.

12. The transmission device according to claim 9, wherein the centering and guiding means are roller bearings.

13. The transmission device according to claim 1, wherein the axis of the transfer shaft is arranged substantially in the vertical plane containing the axis of the output shaft of the gearbox.

14. The transmission device according to claim 2, wherein the axis of the transfer shaft is arranged substantially in the vertical plane containing the axis of the output shaft of the gearbox.

15. The transmission device according to claim 1, wherein the transfer shaft is laterally offset to the left or to the right with respect to the vertical plane containing the axis of the output shaft of the gearbox.

16. The transmission device according to claim 2, wherein the transfer shaft is laterally offset to the left or to the right with respect to the vertical plane containing the axis of the output shaft of the gearbox.

17. The transmission device according to claim 1, wherein a protective boot is fixed to the front face of the casing, around the transfer shaft.

18. A vehicle with a front cab, fitted with the transmission device according to claim 1.

19. A vehicle with a front cab and a lowered platform, fitted with the transmission device according to claim 1.

20. A vehicle with a front cab and a lowered platform, fitted with the transmission device according to claim 2.

* * * * *